United States Patent [19]

Drinkard, Jr. et al.

[11] Patent Number: 5,026,530

[45] Date of Patent: Jun. 25, 1991

[54] METHOD FOR PRODUCING COPPER ARSENATE COMPOSITIONS

[75] Inventors: William F. Drinkard, Jr., Charlotte; Hans J. Woerner, Mt. Pleasant, both of N.C.

[73] Assignee: Drinkard Developments, Charlotte, N.C.

[21] Appl. No.: 502,564

[22] Filed: Mar. 30, 1990

[51] Int. Cl.$^5$ .............................................. C01G 28/02
[52] U.S. Cl. ..................... 423/87; 423/601; 423/602
[58] Field of Search .................... 423/601, 602, 87

[56] References Cited

U.S. PATENT DOCUMENTS

| | | | |
|---|---|---|---|
| 1,085,898 | 2/1914 | Fischer | 423/601 |
| 1,517,516 | 12/1924 | Lloyd et al. | 423/602 |
| 1,596,662 | 8/1926 | Jenkins et al. | 423/602 |
| 2,112,102 | 3/1938 | Klumpp | 423/602 |
| 2,573,252 | 10/1951 | Farber | 423/601 |

FOREIGN PATENT DOCUMENTS

| | | | |
|---|---|---|---|
| 69011 | 5/1974 | Australia | 423/602 |
| 627083 | 8/1978 | U.S.S.R. | 423/602 |
| 101029 | 2/1917 | United Kingdom | 423/602 |
| 445840 | 1/1935 | United Kingdom | 423/602 |

*Primary Examiner*—Wayne A. Langel
*Attorney, Agent, or Firm*—Ralph H. Dougherty

[57] ABSTRACT

A method of preparing copper arsenate compositions having unique advantges in lower cost and higher performance for use in preparing chromated copper arsenate wood preserving formulations. These copper arsenate compositions are insoluble copper arsenate in water or as a dry reactive powder, have a mol ratio of $As_2O_5$ to CuO of 1:4, and is readily soluble in chromic acid to form CCA wood preservatives. This copper arsenate is prepared by reacting suitable copper-bearing materials with arsenic trioxide and air or oxygen in ammoniacal solutions. Either or both of the starting raw materials, i.e., the copper and the arsenic, may be very impure, which impure materials were heretofore unsuitable for the production of copper arsenate.

24 Claims, No Drawings

METHOD FOR PRODUCING COPPER ARSENATE COMPOSITIONS

FIELD OF INVENTION

The present invention relates to the production of copper arsenate, and more particularly to the production of copper arsenate from starting materials including arsenic trioxide and copper, either or both of which can be impure. The resulting copper arsenate is, however, purer than those produced by other processes for copper-chrome-arsenic (CCA) timber preservatives. Thus, the invention offers dual advantages: the ability to use lower cost, more abundant raw materials while simultaneously improving the performance of the resulting CCA wood preservative.

BACKGROUND OF THE INVENTION

It has been common to prepare copper and chrome-arsenic compositions for use as timber preservatives from chromic acid, copper oxide and arsenic acid starting materials. In such a process, the arsenic acid may be derived from arsenic trioxide, but such arsenic trioxide must be particularly pure, otherwise the impurities therein would be carried through the process into the arsenic acid solution.

When such contaminated arsenic acid is used in the manufacture of CCA, the impurities become insolubilized in the CCA wood treating solution. The resulting precipitate not only represents an economic loss, but it may block pumps, valves and other portions of the handling and treating equipment. In addition, because of the chrome and arsenic content of CCA wood preservative, these precipitates represent a significant environmental hazard.

Although many acid-soluble substances such as calcium, aluminum, etc., are undesirable, the major problem-causing precipitate is acid solubilized iron.

As presently formulated, CCA preservatives cannot use copper metal as a raw material, because the copper metal would reduce the chromic acid causing total precipitation of the CCA. Since copper oxide and other suitable copper forms of raw materials for CCA manufacture, such as copper carbonate, are manufactured from copper metal, they always command a premium price above the base metal. Such prices, traditionally, are 50% to 100% higher than the base copper metal price.

Processes have been invented that allow the use of copper metal directly in the oxidizing arsenic acid process, but, unlike the present invention, all of these processes, because of their acidic nature, require a very pure form of copper. Any iron or other acid soluble impurity present in the copper or arsenic starting raw materials will be found in the copper arsenate formed by these processes and carried by it into the CCA causing precipitation.

During the past twenty years, there have been many occasions when suitable arsenic trioxide for arsenic acid manufacturing was in very short supply, either it was not available or available only at exorbitant prices. Such supply and price difficulties have applied equally to suitable copper and copper oxide materials.

OBJECTS OF THE INVENTION

It is the principal object of the present invention to provide a method for improving the environmental and economic quality of CCA.

It is also an object of this invention to provide a method for producing a high purity copper arsenate.

It is also an object of this invention to provide a method for producing a high purity copper arsenate which will free CCA manufacturers from their present dependence on a limited number of suitable purity copper and arsenic sources.

It is also an object of this invention to provide a method for producing a high purity copper arsenate which will significantly lower the cost of both copper and arsenic raw materials.

It is also an object of this invention to provide a method for producing a high purity copper arsenate which will allow the use of very impure arsenic raw materials, such as those presently being wasted and stored underground by gold and copper refiners.

It is also an object of this invention to provide a method for producing a high purity copper arsenate which will allow the use of off-grade copper sources, not only copper scrap, but also copper associated with iron by-products and scrap products which sell for significant discounts below copper scrap prices.

It is also an object of this invention to provide a method for producing a high purity copper arsenate which will allow the direct use of many copper and arsenic containing by-products from industrial and mining operations without the need to purify these before using them in our process.

It is also an object of this invention to provide a process that may be operated without atmospheric discharge of waste.

It is also an object of this invention to provide a process that may be operated without solid waste discharge.

It is also the object of this invention to provide a method for producing a high purity copper arsenate from arsenic trioxide, copper and oxygen, the steps of which method may be performed separately or may be performed in a combination of two or more steps together.

It is also an object of this invention to provide a method for producing a high purity copper arsenate which will convert ammonium arsenite to cuprammonium arsenate in a single reaction.

SUMMARY OF THE INVENTION

The present invention is a process for the production of copper arsenate, which comprises: (a) reacting arsenic trioxide with aqueous ammonia to produce ammonium arsenite solution; (b) reacting the ammonium arsenite solution so produced with copper and cupric ion in the presence of oxygen to produce cuprammonium arsenite; (c) reacting the cuprammonium arsenite so produced with copper in the presence of oxygen and a catalyst to produce a copper ammonium arsenate solution, and d) removing ammonia and recovering a slurry of copper arsenate.

The copper arsenate produced by this process is different from the copper arsenate produced by acidic processes, which are blue and have the chemical formula ranging from $(2.5CuO:As_2O_5 \times H_2O)$ to $(3.5CuO:As_2O_5 \times H_2O)$. The copper arsenate of the present invention has the chemical formula $4CuO:As_2O_5 \times H_2O$, and has a green color.

DETAILED DESCRIPTION OF THE INVENTION

Initially, arsenic trioxide is reacted with aqueous ammonia which has been recovered from stripping the cuprammonium arsenate to produce ammonium arsenite. Crude arsenic trioxide, containing substantial impurities, may be used instead of pure arsenic trioxide. The impurities of crude arsenic trioxide that cause precipitation and other problems in CCA solutions, such as iron, are insoluble in the ammonium arsenite solution and may be easily filtered out. The crude arsenic trioxide can be in a form derived from well known arsenic containing ores and residues, for example, the 80 to 90% arsenic trioxide that is commonly captured by electrostatic precipitation from gold and copper refining operations.

To minimize equipment size and to maintain the water balance needed to avoid discharge from this process, it is desirable to carry out the reaction at temperatures above ambient temperatures. Temperatures as high as 90 to 95 degrees C. have been used satisfactorily, but routine production is preferably maintained at about 70 degrees C.

While it has been commonly believed that higher concentrations of arsenic trioxide may be dissolved with higher ammonia concentration of the aqueous solution, this has been found to be untrue. The ammonia concentration as $NH_3$ should be from about 3 to about 6 percent, optimally around 4%. The ammonia concentration may vary between 1 and 12%, but for routine work, the optimum concentration is best.

Crude arsenic trioxide and even many purified forms of arsenic trioxide are somewhat hydrophobic and tend to form a separate solid phase above the liquid, thus greatly slowing the reaction. We have now found that the addition of a small amount of a low-foaming, nonionic surfactant, such as Triton DF-16, manufactured by Rohm and Haas, of Philadelphia, Pa., greatly speeds up the process. Usually about 1 fluid ounce of surfactant per 1,000 gallons of aqueous ammonia is sufficient for effective dissolution of arsenic trioxide.

The aqueous ammonia solution is capable of approaching quantitative solubilization of any arsenic trioxide present as such in the incoming arsenic trioxide bearing raw materials.

Depending o the nature and quantity of the impurities in the crude arsenic trioxide, it can be desirable to have more than one ammonia reaction or washing step to recover additional arsenic values.

For the purpose of describing the steps of the invented process, it is assumed that this is one of the crude arsenic trioxides that does not require an additional reaction, washing, or filtration step.

After the crude arsenic trioxide has been dissolved in the ammonia solution to form soluble ammonium arsenite, the impurities associated with the arsenic, such as iron oxide, rock dust, etc., are easily removed by filtration. If needed, the filter cake, of course, can be washed or re-pulped and washed or even additionally reacted if that is the particular nature of this particular arsenic bearing source.

In the second reaction step, the ammonium arsenite solution resulting from the first step is used to dissolve copper in the presence of cupric ion and oxygen to produce cuprammonium arsenite. A third reaction converts the cuprammonium arsenite to cuprammonium arsenate, again in the presence of oxygen and a catalyst.

We have found that potassium iodide at a concentration of 1 ounce per 1,000 gallons of aqueous ammonia is the best catalyst to use, although other halides, particularly iodides, bromides, and chlorides, also have a promoting effect.

While the second and third reactions can be considered a two stage process, we have discovered that they can be performed as a single step.

The copper used in the second reaction can be a primary copper, such as copper wire, cathodes, or the like. However, it need not be a pure copper, but can be copper scrap or iron-containing (bi-metallic) copper scrap, such as armatures from electric motors. Various mine products, such as cement copper and various copper and arsenic precipitates may also be used. Waste or byproduct metal arsenides or arsenates can also be utilized in the invented process. Metal arsenides must be added to the copper-oxidation reaction which will oxidize the arsenic present in the arsenide form to the arsenate form. When the arsenide is copper, a reduction of copper from other sources is effected. Arsenates, such as ferric arsenate are preferably added to the arsenic trioxide reaction stage.

It has been found advantageous to conduct both of these reactions in a closed, mildly pressurized vessel which serves to prevent the loss of ammonia and speeds up the process because of the higher solubility of the oxygen. To keep equipment costs low, the preferred pressure is on the order of about 20 psig. The oxygen is avidly absorbed by the reaction and the method by which it is added is not vital. An in-line eductor is suitable for this purpose.

During our first year of pilot plant research, on numerous occasions there were slight bits of copper metal or cuprous oxide in the final copper arsenate precipitate. These are deleterious in that in either form they serve to reduce the chromic acid content of the CCA, therefore requiring either additional chromic acid to be added or, in many cases, premature precipitation of the wood preservative. After a great deal of work, we found that the answer was strong dissemination of the solid copper phase at this stage into the copper-ammonia-arsenic-oxygen solution. Depending on the form, size and shape of the copper or copper bearing raw materials used, there should be sufficient agitation to suspend these materials throughout the solution until they have been completely and quantitatively reacted.

To prevent ammonia losses, the preferred order of introducing the reactants into the oxidation vessel is:

Add the copper raw material, preferably in the form of a solid or slurry, to the heel of cupric ammonium arsenate remaining from the previous reaction. The heel should be about 1% of the volume of the total charge added. The catalyst should also be added at this time.

Close the oxidation vessel and add the ammonium arsenite solution. Anhydrous or recovered aqueous ammonia must be added at this point if analysis indicates that there is insufficient ammonia to secure the proper mol ratio of copper to ammonia to form the ouprammonia oomplex ($Cu:4NH_3$).

The vessel is then heated to 185 degrees F. temperature, and the stream of oxygen is started. Oxidation is rapid and exothermic. No additional heating is necessary after the introduction of the oxygen. The end point of the reaction is determined by:

a: Oxygen reaction stops. Oxygen pressure rises.

b. Tests for cuprous ion negative. Tests for arsenite ion negative.

c. Weight ratio: $CuO/As_2O_5/NH_3 = 1:0.909:1$. This ratio is very important. For best results, the copper oxide/arsenic pentoxide ratio must be held as close as possible to that given.

After the reaction is completed, any non-reacted matter, such as metallic iron or other impurities introduced with the copper source, is removed by settling or filtration. It is essential that adequate solid-liquid separation be used to prevent any metallic particles from passing through into the copper arsenate. The resulting cuprammonium arsenate solution is now ready for precipitation by removing the ammonia.

In the precipitation reaction, the ammonia can be removed from the cuprammonium arsenate by a number of means, such as inert gas stripping, steam injection, vacuum extraction, heating, or a combination thereof. However, to prevent atmospheric pollution, we elect to remove the ammonia by heating, collecting it in scrubbing devices downstream from the precipitators. Heating is continued until there is no blue color (the characteristic color of the cuprammonium ions is blue) in the supernatant liquor. Here again we found great difficulty in our initial pilot work. About one-third of the time, the copper arsenate would not precipitate as anticipated by theory. It forms a gel-like mass around the agitator blades in the stripping reactor, causing severe vibrations and the need to heat for days rather than hours. Through a great deal of trial and error work, it was found that there was a very narrow range of copper oxide (CuO) to arsenic pentoxide ($As_2O_5$) ratio that is required to effect rapid, repetitive precipitation of the copper arsenate. The ratio that is needed for trouble-free production is $CuO:As_2O_5 = 1.0:0.92$. Deviation from this ratio of approximately ±0.2 is acceptable, but deviation from the optimum ratio will cause an increase in precipitation time, and deviation outside the broad ratio range may result in complete stoppage of production. Just before the precipitation step, the total concentration of ammonia, copper as oxide, and arsenic as pentoxide varies with temperature, but usually is just under twenty percent.

The copper arsenate which results from the precipitation reaction can be recovered by many means such as filtration, centrifuging or settling. The copper arsenate slurry, after filtering, can be used directly in the manufacture of CCA, or the product can be dried for shipping or storage.

Although the three reactions can be conducted as separate stages, this is not necessary, nor indeed desirable. It is also possible, if high purity materials are used, such as arsenic trioxide and copper, to conduct all of these reactions in one vessel, including the precipitation reaction.

The removed ammonia from the process is recycled and used in the following batch operation in the form of aqueous ammonia.

The process may be operated without solid waste discharge. This requires the use of sufficient high purity copper and arsenic raw materials so that no solid waste is generated that might require disposal. This zero solids discharge process for the production of copper arsenate avoids both atmospheric and environmental pollution.

SUMMARY OF THE ACHIEVEMENT OF THE OBJECTS OF THE INVENTION

From the foregoing, it is readily apparent that we have invented an improved method for improving the environmental and economic quality of CCA, by producing a high purity copper arsenate. This product will free CCA manufacturers from their present dependence on a limited number of suitable purity copper and arsenic sources, will significantly lower the cost of both copper and arsenic raw materials, will allow the use of very impure arsenic raw materials, such as those presently being wasted and stored underground by gold and copper refiners. The process also allows the use of off-grade copper sources, not only copper scrap, but also copper associated with iron by-products and scrap products which sell for significant discounts below copper scrap prices, as well as many copper and arsenic containing by-products from industrial and mining operations without the need for purification before using them. The process inherently does not pollute the atmosphere, and by use of high purity raw materials, the process can be made totally non-polluting to the environment.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A process for the production of copper arsenate comprising:
   a) reacting arsenic trioxide with aqueous ammonia to produce ammonium arsenite solution,
   b) reacting ammonium arsenite solution so produced with copper and oxygen in the presence of cupric ion and a halide catalyst to produce cuprammonium arsenate solution, and
   c) removing ammonia from the cuprammonium arsenate solution so produced to yield a slurry of copper arsenate.

2. A process according to claim 1 wherein the arsenic trioxide is crude arsenic trioxide.

3. A process according to claim 1 wherein the arsenic trioxide is in crude form derived from metal arsenides or arsenates.

4. A process according to claim 1, further comprising beginning with a starting solution of a cupric ammonium arsenate heel from a preceeding batch, said heel being about 1% by volume of the total solution.

5. A process according to claim 1 further comprising agitating said reactants in step "b" to a sufficient degree to suspend the copper metal particles or other solid copper forms.

6. A process according to claim 1 further comprising adding a non-foaming, non-ionic surfactant, in step "a".

7. A process according to claim 1 in which removal of ammonia and resultant precipitation is performed at a copper (II) oxide to arsenic pentoxide ratio of from 1.0:0.72 to 1.0:1.12.

8. A process according to claim 7 in which removal of ammonia and resultant precipitation is performed at a copper (II) oxide to arsenic pentoxide ratio of 1.0:0.92.

9. A process according to claim 1 wherein the copper source is selected from group consisting of primary copper, scrap copper, cement copper, and bi-metallic scrap.

10. A process according to claim 1 wherein the copper source is selected from copper-arsenic by-products.

11. A process according to claim 1 wherein the arsenic source is selected from arsenic waste products.

12. A process according to claim 1 wherein the reactions are carried out at a pressure above atmospheric.

13. A process according to claim 1 further comprising filtering the ammonium arsenite solution to remove insoluble impurities.

14. A process according to claim 1 further comprising filtering the cuprammonium arsenate solution to remove insoluble impurities.

15. A process according to claim 1 wherein step "b" is carried out at a temperature from ambient to about 95 degrees C.

16. A process according to claim 1 wherein the aqueous ammonia concentration is from on to 12 percent.

17. A process according to claim 16 wherein the aqueous ammonia concentration is from 3 to 6 percent.

18. A process according to claim 16 wherein the aqueous ammonia concentration is about 4 percent.

19. A process according to claim 1 wherein the catalyst is an iodide, bromide, or chloride.

20. A process according to claim 19 wherein the catalyst is potassium iodide.

21. A process according to claim 10 wherein said copper-arsenic by-products are copper arsenide and copper arsenate.

22. A process according to claim 11 wherein said arsenic waste products are selected from the group consisting of ferric arsenate, copper arsenate, and calcium arsenate.

23. A process according to claim 1, further comprising recycling the removed ammonia to step a) to continue the process, whereby the process results in no discharge to the atmosphere.

24. A process according to claim 1, wherein said arsenic trioxide is purified arsenic trioxide, and further comprising recycling the removed ammonia to step a) to continue the process, whereby the process results in no solid waste discharge.

* * * * *

UNITED STATES PATENT AND TRADEMARK OFFICE
CERTIFICATE OF CORRECTION

PATENT NO. : 5,026,530
DATED : June 25, 1991
INVENTOR(S) : William F. Drinkard, Jr.
Hans J. Woerner It is certified that error appears in the above-indentified patent and that said Letters Patent is hereby corrected as shown below:

Column 3, Line 49, change "Depending o"
to -- Depending on --.

Column 7, Line 21, in claim 16, change "from on" to
-- from one --.

Signed and Sealed this

Eighteenth Day of October, 1994

Attest:

BRUCE LEHMAN

*Attesting Officer*  *Commissioner of Patents and Trademarks*